United States Patent [19]
Arjunan et al.

[11] Patent Number: 5,700,871
[45] Date of Patent: Dec. 23, 1997

[54] COMPATIBILIZED ELASTOMER BLENDS CONTAINING GRAFTED POLYMERS OF AN ISOOLEFIN AND ALKYLSTYRENE

[75] Inventors: Palanisamy Arjunan, Houston, Tex.; Donald Andrew White, Princeton, N.J.

[73] Assignee: Exxon Chemical Patents Inc., Houston, Tex.

[21] Appl. No.: 425,323

[22] Filed: Apr. 17, 1995

Related U.S. Application Data

[63] Continuation of Ser. No. 49,540, Apr. 19, 1993, abandoned.

[51] Int. Cl.$^6$ ................................................. C08L 51/04
[52] U.S. Cl. ........................ 525/74; 525/73; 525/76; 525/77; 525/78; 525/80
[58] Field of Search ........................ 525/74, 78, 73, 525/76, 77, 80

[56] References Cited

U.S. PATENT DOCUMENTS

| | | | |
|---|---|---|---|
| 3,862,265 | 1/1975 | Steinkamp et al. | 525/192 |
| 5,013,793 | 5/1991 | Wang et al. | 525/195 |
| 5,100,947 | 3/1992 | Puydak et al. | 525/74 |
| 5,162,445 | 11/1992 | Powers et al. | |
| 5,206,303 | 4/1993 | Tse et al. | 525/319 |
| 5,227,426 | 7/1993 | Tse et al. | 524/534 |
| 5,238,990 | 8/1993 | Yu et al. | 524/504 |
| 5,356,950 | 10/1994 | White et al. | 525/285 |

FOREIGN PATENT DOCUMENTS

| | | |
|---|---|---|
| WO 92/16569 | 10/1992 | WIPO . |
| WO 93/08220 | 4/1993 | WIPO . |

*Primary Examiner*—Mark L. Warzel
*Attorney, Agent, or Firm*—Myron B. Kuntzman; Frank E. Reid; Cathrine L. Bell

[57] ABSTRACT

A compatibilized polymer blend composition is provided which comprises a mixture of an elastomeric polymer and an acid-grafted polymer of an isomonoolefin and an alkylstyrene such as a blend of EPDM and a maleic anhydride-grafted copolymer of isobutylene and para-methylstyrene.

21 Claims, No Drawings

COMPATIBILIZED ELASTOMER BLENDS CONTAINING GRAFTED POLYMERS OF AN ISOOLEFIN AND ALKYLSTYRENE

This is a continuation of application Ser. No. 08/049,540, filed Apr. 19, 1993 now abandoned.

BACKGROUND OF THE INVENTION

1. Field of the Invention

The present invention relates to the preparation of compatible polymer blends containing an acid grafted copolymer of a $C_4$ to $C_7$ isoolefin copolymerized with an alkyl styrene, mixed with a dissimilar polymer.

2. Description of Related Art

Copolymers of a $C_4$ to $C_7$ isoolefin, e.g., isobutylene, and up to about 20 mole % of a multiolefin such as isoprene (butyl rubber) are well known polymer materials whose vulcanizates offer some outstanding properties not possessed by many other diolefin based elastomers. Articles prepared from many cured butyl and halogenated butyl elastomers offer improved resistance to oils and greases as well as resistance to oxygen and ozone degradation. Butyl rubber vulcanizates exhibit good abrasion resistance, excellent impermeability to air, water vapor and many organic solvents, as well as resistance to aging and sunlight. These properties render these materials ideal candidates for one or more applications such as water hoses, organic fluid hoses, components in tire construction, gaskets, adhesive compositions and various molded articles.

More recently, a new class of elastomeric interpolymers have been discovered which offer many of the same properties as butyl rubber, but are even more ozone and solvent resistant and are more readily curable. These materials include copolymers of an isoolefin, such as isobutylene, and a para-alkylstyrene, such as para methylstyrene, (hereinafter referred to as I-PAS copolymers) wherein up to about 60 mole % of the benzylic hydrogen may be replaced by a functional group such as halogen or a nucleophile group such as an ester, ether, nitrile, carboxy, hydroxyl, mercapto, mixtures thereof and like groups. These polymers are disclosed in U.S. Pat. No. 5,162,445, which is incorporated by reference.

Even more recently, graft copolymers derived from the aforementioned isoolefin/para alkylstrene copolymers have been prepared by reaction thereof with an unsaturated organic compound selected from the group consisting of an unsaturated carboxylic acid or derivative thereof, such as disclosed in U.S. Pat. No. 5,356,950 issued Oct. 18, 1994. The use of such grafted polymers as an impact modifier in polyamide compositions is disclosed in U.S. patent application Ser. No. 710,492, filed Jun. 5, 1991 now U.S. Pat. No. 5,238,990.

As stated above, the superior properties of vulcanizates based on I-PAS copolymers, including halogenated versions thereof, render them eminently suitable in applications where good heat aging, weatherability, ozone resistance, impermeability to liquids, gases and vapors, energy absorption, flex cracking resistance and chemical resistance are important. Such applications include belts and hoses for water or organic fluids, gaskets, components in tire construction, adhesives, various molded articles, conveyor belts, air springs, and the like.

Yet another application suggested for I-PAS is its use as a blend component with one or more dissimilar elastomers which lack one or more of these properties in order to enhance these properties in compositions containing such dissimilar elastomers and/or to impart one or more beneficial properties of the dissimilar elastomer into compositions containing I-PAS.

For example, Neoprene [polychloroprene) rubber (CR) has been the material of choice in most power transmission belts, due to its unique combination of properties: oil resistance, toughness, dynamic flex life, good adhesion to other materials and heat resistance up to 100° C. In the past, CR belts have kept pace with the needs of the automotive industry, but recently there is a need for new materials for more demanding applications. First of all, CR belts are encountering greater heat duress in service due to increasing underhood temperatures (up to 150° C.). Secondly, to meet automotive industry's longer warranty periods ("100,000 mile target"), the CR belts must have a lower failure rate with high mean life, even when high temperatures are encountered. To meet these emerging needs, improvements in heat, ozone, and cut growth resistance of neoprene belts are desirable.

Nitrile rubber (NBR) is used in automobiles because of its resistance to fuels, a variety of oils and other fluids over a wide range of temperature. However, nitrile rubber, as such, cannot be used in specific applications requiring heat and ozone resistance. The poor ozone resistance and heat ageing properties of NBR (which is a random copolymer of acrylonitrile and butadiene) are believed to be the result of unsaturation in the backbone of the polymer which permits scission of the polymer chain to occur under certain adverse conditions.

More highly unsaturated rubbers such as natural rubber, polyisoprene, polybutadiene and butadiene/styrene copolymer rubber may exhibit good properties in terms of wear resistance, flexibility, road adhesion and the like, but these materials are also subject to chemical attack and oxygen and ozone degradation, which may limit the useful lifetime of articles prepared from their vulcanizates such as tires, hoses, windshield wipers, gaskets and molded automotive components.

However, the use of I-PAS rubber in blends with other elastomers is often limited to those other elastomers which have a mutual compatibility and comparable cure rate behavior with respect to the I-PAS rubber. Thus, whereas highly unsaturated elastomers such as butadiene/styrene copolymers may, in some cases, be reasonably compatible with I-PAS rubber and may be co-vulcanized because of the high availability of sites of ethylenic unsaturation, other elastomers such as polychloroprene, butadiene/acrylonitrile copolymers and like materials containing polar groups along the chain and/or a relatively low degree of ethylenic unsaturation are not so readily co-vulcanized. In the case of blends with these latter elastomers, chemical and ozone resistance may be improved due to the influence of the I-PAS rubber, but often at the expense of a lowering of physical properties such as tensile strength, elongation, modulus and/or abrasion resistance of the co-vulcanizate as compared with the cured elastomer itself.

The role of a compatibilizer in an elastomer blend is manifold: (1) reduce the interfacial energy between the phases, (2) permit a finer dispersion during mixing, (3) provide a measure of stability against gross segregation, and (4) result in improved interfacial adhesion (G. E. Molau, in "Block Copolymers", Ed by S. L. Agarwal, Plenum, New York, 1970, p. 79).

Two elastomers form a compatible mixture when they have at least one of the following characteristics:

Segmental structural identity. For example, a graft or block copolymer of butadiene and styrene is compatible with either polybutadiene or polystyrene.

Miscibility or partial miscibility with each other, such as reflected by solubility parameter differences <1, generally <0.2 units. For example, poly (vinyl chloride), PVC, poly (ethylacrylate), PEA, poly (methylacrylate), PMA, have solubility parameters in the 9.4–9.5 range and form compatible mixtures. Although, the structure of nitrile rubber (NBR) is entirely different from that of PVC, PMA and PEA, it has a similar solubility parameter of 9.5 and is compatible with these three polymers.

Functional groups capable of generating covalent, ionic, donor-acceptor or hydrogen bonds between the polymers.

Compatibilization of dissimilar elastomer blends is an area of active interest from both technological and scientific points of view. Many of the synthetic and natural elastomers have good properties such that when combined with other rubbers of similar or complementary properties, they produce desirable traits in the products.

SUMMARY OF THE INVENTION

The present invention provides for blends of: (i) a polymer comprising a $C_4$ to $C_7$ isomonoolefin, an alkylstyrene, and optionally a halogenated alkylstyrene, grafted with an unsaturated organic compound selected from the group consisting of unsaturated carboxylic acids, unsaturated carboxylic acid derivatives and mixtures thereof, and (ii) at least one dissimilar elastomer.

The blends of this invention give rise to compositions and vulcanizates having a good balance of physical and chemical properties and improved heat, ozone and oil resistance.

DETAILED DESCRIPTION OF THE INVENTION

The grafted polymer component is a reaction product of a polymer (Reactant A) and an unsaturated organic compound (Reactant B).

Preferred polymers suitable as Reactant A of the present invention include copolymers of isomonoolefin having from 4 to 7 carbon atoms and a para-alkylstyrene, such as those described in U.S. Pat. No. 5,162,445, the complete disclosure of which is incorporated herein by reference. The alkyl preferably contains 1 to 8 carbon atoms, even more preferably 1 or 2 carbon atoms. Para-methylstyrene and isobutylene are preferred monomers.

These copolymers preferably have a substantially homogeneous compositional distribution and include one or more para-alkylstyrene moieties represented by the formula:

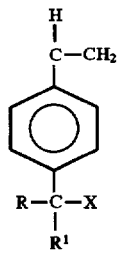

in which R is hydrogen or a $C_1$ to $C_5$ alkyl; $R^1$ is hydrogen, a halogen or a $C_1$ to $C_5$ alkyl; and X is hydrogen or a halogen. Preferred haolgens are Br and Cl.

Preferred isomonoolefins include but are not limited to isobutylene. Suitable copolymers of an isomonoolefin and a para-alkylstyrene include copolymers having a number average molecular weight (Mn) of at least about 25,000, preferably at least about 30,000, more preferably at least about 100,000. The copolymers also, preferably, have a ratio of weight average molecular weight (Mw) to number average molecular weight (Mn), i.e., Mw/Mn of less than about 6, preferably less than about 4, more preferably less than about 2.5, most preferably less than about 2. Most useful of such copolymers are elastomeric copolymers of isobutylene and para-methylstyrene (I-PMS) containing from about 0.5 to about 20 mole % para-methyl styrene and preferably having a content of the para isomer in excess of 90 wt. %, wherein up to about 60 mole % of the methyl substituent groups present on the benzyl ring may contain a bromine or chlorine atom, preferably a bromine atom. These copolymers preferably have a substantially homogeneous compositional distribution such that at least 95% by weight of the polymer has a para-alkylstyrene content within 10% of the average para-alkylstyrene content of the polymer. They are also characterized by a very narrow molecular weight distribution (Mw/Mn) of less than about 2.5, a preferred viscosity average molecular weight in the range of from about 300,000 up to about 2,000,000, and a preferred number average molecular weight in the range of from about 25,000 to about 500,000.

These copolymers may be prepared by slurry polymerization of the monomer mixture using a Lewis Acid catalyst, optionally followed by halogenation, preferably bromination, in solution in the presence of halogen and a radical initiator such as heat and/or light and/or a chemical initiator.

Preferred brominated copolymers generally contain from about 0.1 to about 5 mole % of bromomethyl groups, most of which is monobromomethyl, with less than 0.05 mole % dibromomethyl substituents present in the copolymer. These copolymers, their method of preparation, their method of cure and graft or functionalized polymers derived therefrom are more particularly disclosed in the aforementioned U.S. Pat. No. 5,162,445.

Suitable unsaturated organic compounds for use as Reactant B in preparing the graft copolymers include unsaturated carboxylic acids, unsaturated carboxylic acid derivatives and mixtures thereof. The carboxylic acid may be a mono or polycarboxylic acid, preferably having from 3 to 12 carbon atoms. By way of example, the unsaturated carboxylic acid may be maleic acid, fumaric acid, citraconic acid, mesaconic acid, itaconic acid, himic acid, acetylenedicarboxylic acid and mixtures thereof. A preferred carboxylic acid is maleic acid. The unsaturated carboxylic acid derivative may be a cyclic acid anhydride, an amide, an imide, an ester and mixtures thereof. Suitable cyclic acid anhydrides include maleic anhydride, citraconic anhydride, itaconic anhydride, and himic anhydride. A preferred anhydride is maleic anhydride.

Suitable esters include mono- and di-esters of diacids specified above, e.g. monomethyl maleate, dimethyl maleate, diethyl maleate, dibutyl maleate, diphenyl maleate and dibutyl fumarate, as well as unsaturated di-esters and half esters.

Suitable amides including mono- and di-amides of diacids specified above, e.g. maleamic acid, N-methylmaleamic acid and maleanilic acid.

Suitable imides include imides of diacids specified above, e.g. maleimide, N-methylmaleimide and N-phenylmaleimide.

Preferred carboxylic acid derivatives are selected from the group consisting of maleic anhydride, a dialkyl maleate, itaconic anhydride, himic anhydride, an alkylmaleamide, an N-alkylmaleimide, an alkylmaleate and mixtures thereof.

The reactant (B) may be present in the grafted polymer of the present invention in an amount ranging from about 0.5 to 0.001 millimole (mmole) per gram, preferably from about 0.2 to 0.002 mmole per gram, more preferably from about 0.15 to 0.005 mmole per gram of the grafted polymer product.

The grafted polymers of the present invention are prepared by reacting a polymer, Reactant A previously described, with an unsaturated organic compound, Reactant B previously described, in the presence of a free radical initiator at grafting reaction conditions in a reaction zone. The free radical initiator which may be a chemical compound or radiation. Suitable free radical initiators include (1) thermally decomposable compounds which generate radicals such as azo compounds or organic peroxides; (2) compounds which generate free radicals by non-thermal methods such as photochemical or redox processes; (3) compounds which have inherent radical character such as molecular oxygen; or (4) electromagnetic radiation such as X-rays, electron beams, visible light and ultraviolet-light.

Suitable organic peroxide compounds include hydroperoxides, dialkyl peroxides, diacyl peroxides, peroxyesters, peroxydicarbonates, peroxyketals, ketone peroxides and organosulfonyl peroxides.

Preferably, the free radical initiator is an organic peroxide compound having a half-life, at the reaction temperature, of less than one tenth of the reaction/residence time employed.

When the free radical initiator is a compound, suitable molar ratio of free radical initiator compound to Reactant B may range from 0.001:1 to 1:1, preferably from 0.01:1 to 0.1:1. Other methods for preparing these grafted polymers known in the art can also be used.

For example, when it is desired to graft a derivative of an acid or anhydride onto the copolymer (Reactant A), instead of reacting the copolymer with the acid derivative, the copolymer (Reactant A) may be reacted with the unsaturated carboxylic acid or anhydride and the resulting carboxylic acid grafted or carboxylic acid anhydride grafted polymer may subsequently be reacted with a desired functional group-containing compound, e.g., an organo amine.

Desirably, the molar amount of Reactant B expressed in mmoles per gram, in the contacting zone may be 1 to 10 times the molar amount of these components as is desired in the final grafted copolymer. Thus, when the molar amount of B in the grafted copolymer is 0.05 mmoles per gram of product polymer, the amount of B introduced in the reaction zone is suitably from about 0.05 to about 0.5 mmoles per gram of component A plus component B present in the reaction mixture.

The process for producing the grafted polymers of the present invention may be conducted as a batch process or as a continuous process. The reaction is performed in a suitable reaction zone which may be a polymer mixing device such as a Banbury mixer, a single or multiple screw extruder and the like for melt phase polymers or a glass flask, metal tank or tube when the process is conducted in the presence of a diluent.

The grafting reaction may be conducted in the absence of a diluent or in the presence of a diluent. When a diluent is present in the reaction zone, suitable diluents include saturated aliphatic hydrocarbons, aromatic hydrocarbons, and perhalogenated hydrocarbons. Preferably, the grafting reaction is conducted in the absence of a diluent and in the melt phase, wherein the copolymer (Reactant A) is in the molten phase. The reaction temperature is chosen to be appropriate for the catalyst or initiator used.

Suitable reaction conditions include a temperature ranging from about 0° C. to about 300° C. The suitable reaction temperature will vary according to the free radical initiator used. When an azo compound is used as the initiator, suitable temperatures will generally range from about 25° to 100° C. When an organic peroxide is used as the initiator, suitable temperatures range from about 25° to about 250° C. Higher temperatures may be used for other types of free radical initiators. When the reaction is conducted in the presence of a diluent, i.e., solution processes, the reaction temperature will generally be below 150° C. For melt phase processes, (i.e., bulk phase processes), the reaction temperature may range from about 25° C. In conventional electron beam irradiation equipment to one reaction temperature may be up to about 250° C. or more.

When the molten copolymer itself is the reaction medium, uniform dispersion of the grafting agent and of the initiator is preferably performed by predispersion or by the incorporation of suitable mixing elements into the reactor (e.g., incorporation of mixing screw sections in an extruder). When electromagnetic radiation is used, dispersion of the initiator will preferably include uniform exposure of all parts of the copolymer or copolymer solution to the beam.

In a preferred embodiment, the grafting process to produce the grafted polymer of the invention is carried out in a twin screw extruder having, in sequence, screw elements, which will (i) heat the polymer by shear and compression to or close to the desired reaction temperature, (ii) mix the copolymer at or close to reaction temperature with the grafting agent, (iii) mix the copolymer containing the grafting agent with the initiator, (iv) allow appropriate residence time for the grafting reaction, (v) allow venting of unreacted grafting agent and initiator coproducts, (vi) allow mixing of any desired stabilizers or additives and (vii) forward the reacted, vented stabilized polymer to an appropriate finishing device (e.g. drumming device, baler, pelletizer, etc.).

The dissimilar elastomers are those elastomers that are not acid or acid derivative grafted isoolefin/alkylstyrene copolymers. The dissimilar elastomers with which the graft copolymer elastomers may be combined in accordance with this invention include well known non-polar elastomers such as natural rubber, polyisoprene, polybutadiene, copolymers of butadiene with up to 35 wt. % of styrene, butyl rubber, ethylene/propylene rubber (EPR) and terpolymer rubber based on ethylene, propylene and up to about 10 wt. % of a non-conjugated diene such as 1,4-hexadiene, dicyclopentadiene or ethyl norbornene (EPDM). The dissimilar elastomer may also include polar elastomers which are not normally compatible with isobutylene/p-methyl styrene copolymers due to the presence of a large number of polar groups along the polymer chain, such as polychloroprene, nitrile rubber and carboxylated nitrile rubber. The dissimilar elastomer may also comprise a mixture of two or more of these elastomers, i.e., a mixture of polychloroprene and an unmodified isobutylene/p-methylstyrene copolymer. Most preferred dissimilar elastomers are those having functional groups reactive with the grafting moiety of the grafted I-PMS elastomer.

Examples of dissimilar elastomers include, but are not limited to, natural rubber, polyisoprene, polybutadiene, copolymers of butadiene with styrene, copolymers of butadiene with acrylonitrile, butyl rubber, Butyl rubber, polychloroprene, ethylene/propylene rubber and elastomeric copolymers of ethylene, propylene and a non-conjugated diene.

The invention is especially preferred for to blends based on a mixture of grafted I-PMS elastomer and polychloroprene and/or nitrile rubber because it is with respect to these materials that there exists the greatest need to balance their inherently good oil resistance and adhesive properties with improved ozone resistance and enhanced heat stability inherent in the grafted I-PMS elastomers. The invention is also especially applicable to such blends further containing up to about 35% by weight of unmodified I-PMS elastomer.

The polychloroprene elastomer used as the dissimilar elastomer blend in one embodiment of the present invention is a commercially available material, commonly referred to as CR or neoprene rubber. It is available in a number of grades and molecular weights, all of which elastomeric grades are suitable for use in the compositions of this invention. The preferred grade is Neoprene GRT which is more resistant to crystallization and is based on a copolymer of chloroprene and 2,3-dichloro-1,3-butadiene. Neoprene synthesis is also well known in the art. C. A. Hargraves et al., Encyclopedia of Polymer Science and Technology, vol. 3, p. 705–730.

The grafted I-PMS copolymer may be present in the composition in the broad range of from about 5 to 95% by weight of I-PMS and about 95 to 5% by weight of one or a mixture of dissimilar elastomer(s), based on the total elastomer content of the composition. More preferably the composition contains from about 30 to about 90% by weight of the dissimilar elastomer, and most preferably from about 50 to 85% by weight of the dissimilar elastomer, and 70 to 10 wt %, preferably 25 to 50 wt % IPMS elastomer.

The compositions of the present invention may also include conventional mixed vulcanizing systems which are known curatives for the grafted I-PMS rubber and the particular dissimilar elastomer present in the blend. Generally such vulcanizing systems may include a metal oxide such as zinc oxide, magnesium oxide and mixtures thereof, used either alone or mixed with one or more organic accelerators or supplemental curing agents such as an amine, a phenolic compound, a sulfonamide, thiazole, a thiuram compound, thiourea or sulfur. Organic peroxides may also be used as curing agents. The zinc or magnesium oxide is normally present at a level of from about 1 to about 10 parts by weight per 100 parts by weight of elastomer blend, and the sulfur and supplemental curing agents or curing accelerators, where used, may be present at a level of from about 0.1 to about 5 parts by weight per 100 parts by weight of the elastomer blend.

The compositions may also contain other additives such as lubricants, fillers, plasticizers, tackifiers, coloring agents, blowing agents and antioxidants.

Examples of fillers include inorganic fillers such as carbon black, silica, calcium carbonate, talc and clay, and organic fillers such as high-styrene resin, coumarone-indene resin, phenolic resin, lignin, modified melamine resins and petroleum resins. Preferred filler is carbon black present at a level of from about 3 to 50 parts by weight per hundred parts by weight of total elastomer content of the blend, more preferably from about 20 to 40 parts by weight.

Examples of lubricants include petroleum-type lubricants such as oils, paraffins, and liquid paraffins, coal tar-type lubricants such as coal tar and coal tar pitch; fatty oil-type lubricants such as castor oil, linseed oil, rapeseed oil and coconut oil; tall oil, waxes such as beeswax, carnauba wax and lanolin; fatty acids and fatty acid salts such as licinoleic acid, palmitic acid, barium stearate, calcium stearate and zinc laurate; and synthetic polymeric substances such as petroleum resins.

Examples of plasticizers include hydrocarbon oils, e.g., paraffin, aromatic and napththenic oils, phthalic acid esters, adipic acid esters, sebacic acid esters and phosphoric acid-type plasticizers.

Examples of tackifiers are petroleum resins, coumarone-indene resins, terpene-phenol resins, and xylene/formaldehyde resins.

Examples of coloring agents are inorganic and organic pigments.

Examples of blowing agents are sodium bicarbonate, ammonium carbonate, N,N'-dinitrosopentamethylenetetramine, azocarbonamide, azobisisobutyronitrile, benzenesulfonyl hydrazide, toluene-sulfonyl hydrazide, calcium amide, p-toluenesulfonyl azide, salicylic acid, phthalic acid and urea.

The vulcanizable composition may be prepared and blended on any suitable mixing device such as an internal mixer (Brabender Plasticorder), a Banbury Mixer, a kneader or a similar mixing device.

Blending temperatures and times may range from about 45 to 180 degrees C. and 4 to 10 minutes respectively. After forming a homogenous mixture of the elastomers and optional fillers, processing aids, antioxidants and the like, the mixture is then vulcanized by the further mixing-in of crosslinking agents and accelerators followed by heating the resulting blend to a temperature of from about 100 to 250 degrees C., more preferably from about 125 to 200 degrees C. for a period of time ranging from about 1 to 60 minutes. Molded articles such as belts and hoses are prepared by shaping the prevulcanized formulation using an extruder or a mold, and subjecting the composition to temperatures and curing times as set forth above.

EXAMPLES

The following examples are illustrative of the invention.

The materials used in the examples described below were as follows:

A. Neoprene GRT is a polychloroprene elastomer marketed by DuPont;

B. NATSYN-2200 is a polyisoprene elastomer marketed by Good Year.

C. I-PMS is an unmodified copolymer of isobutylene and 10 wt % para-methylstyrene having a Mooney viscosity ML (1+8) 125° C. of 31 and a number average molecular weight (Mn) of 197K.

EXAMPLE 1

This example illustrates the preparation of a graft copolymer of isobutylene and 10 wt % para-methylstyrene grafted with maleic anhydride. The reaction was carried out in a 45 ml Brabender mixer. To avoid contact of the undiluted peroxide initiator with hot metal, it was fed as a 4 percent by weight masterbatch in the copolymer used for this example.

The isobutylene/p-methylstyrene copolymer was charged into the Brabender mixer and brought to 210° C. by external heating and internal mixing. Maleic anhydride (1.5 g; 0.51 mmole/g of reaction mixture) was added followed by the peroxide masterbatch (1.5 g; 4% peroxide). Mixing at 210° C. with a rotor speed of 60 rpm was continued for 3 minutes, timed from the addition of the peroxide masterbatch.

The recovered product was heated in a vacuum oven at 140° C. for 18 hours to strip unreacted maleic anhydride. The grafted maleic anhydride content of the stripped products was estimated to be about 0.10 millimole per gram or about 1.0 wt %.

EXAMPLE 2

Blends having the composition shown in Table 1 (parts by weight) were prepared by mixing the components in a small scale (45 cc) Brabender mixer at a temperature of 110° C. for a period of 5 minutes. These blend samples were then examined in an optical microscope as thin sections (100–200 nm) using phase contrast such that the polychloroprene phase appears black and the I-PMS and grafted I-PMS phases appear a greyish-white.

TABLE 1

|  | Blend #1 | Blend #2 | Blend #3 |
|---|---|---|---|
| Polychloroprene | 70 | 70 | 70 |
| I—PMS | 30 | — | 20 |
| I—PMS (grafted, Ex. 1) | — | 30 | 10 |

Examination under the microscope showed a better and finer dispersion of both the I-PMS and grafted I-PMS phases in the polychloroprene phase as compared with control incompatible blend #1. The particle size of the dispersed phase in blends #2 and #3 was in the order of 1–10 microns whereas the dispersed phase in blend #1 appears as large regions or islands having a particle size of greater than 25–50 microns.

Although not wishing to be bound by theory, it is believed that compatibilization results as a consequence of the reactive acid functionality present in the grafted I-PMS copolymer providing specific interaction with the polychloroprene phase via hydrogen bonding and/or covalent linkage by nucleophilic displacement of allylic chlorine. In addition, structural similarity of the I-PMS and grafted I-PMS results in miscibility with respect to ternary blend #3.

Example 3

Blends having the composition shown in Table 2 were prepared as in Example 2.

TABLE 2

|  | Blend #4 | Blend #5 | Blend #6 |
|---|---|---|---|
| NATSYN 2200 | 70 | 70 | 70 |
| I—PMS | 30 | — | 20 |
| I—PMS (grafted, Ex. 1) | — | 30 | 10 |

Samples of the blends of Table 2 were cryomicrotomed into thin sections (100–200 nm), were stained in OSO4 and were examined using the SEM technique. The control blend #4 had poor dispersion and large domain size (2–10 cm) of I-PMS phase in the polyisoprene phase which indicated the incompatibility of the blend. Better dispersion and smaller domain size (<1 cm) of the grafted I-PMS phase in the polyisoprene phase was achieved in blend #5. This observation clearly indicated the better compatibility of the polyisoprene/grafted I-PMS, 70/30 blend, compared with that of the control blend. Also, the beneficial effect of adding a small amount (10 wt. %) of grafted I-PMS to the control blend was evident in terms of the better dispersion and smaller domain size (<1–5 cm) of the I-PMS phase in the polyisoprene phase. In other words, the grafted I-PMS acted as a compatibilizer in improving the interfacial adhesion (and hence compatibility) between the blend components, polyisoprene and I-PMS.

As is apparent from the foregoing description, the materials prepared and the procedures followed relate to specific embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

What is claimed is:

1. A compatibilized elastomeric composition comprising polymers consisting essentially of:
   i) an elastomeric copolymer comprising a $C_4$ to $C_7$ isomonoolefin and para-alkylstyrene free radically grafted with an unsaturated organic compound selected from the group consisting of unsaturated carboxylic acids, unsaturated carboxylic acid derivatives selected from esters, imides, amides, anhydrides and cyclic acid anhydrides or mixtures thereof,
   ii) at least one dissimilar elastomer selected from the group consisting of natural rubber, polyisoprene, polybutadiene, copolymers of butadiene with styrene, copolymers of butadiene with acrylonitrile, butyl rubber, polychloroprene, ethylene/propylene rubber and elastomeric copolymers of ethylene, propylene and a non-conjugated diene.

2. The composition of claim 1 wherein said dissimilar elastomeric polymer is present in an amount ranging from about 5 to about 95 weight percent and said grafted copolymer is present in an amount ranging from about 95 to about 5 weight percent, based on said polymer blend.

3. The composition of claim 1, wherein said dissimilar elastomeric polymer is present in an amount ranging from about 50 to about 85 weight percent and said grafted copolymer is present in an amount ranging from about 50 to about 15 weight percent, based on said polymer blend.

4. The composition of claim 1 further comprising up to about 35% by weight of an ungrafted copolymer comprising $C_4$ to $C_7$ isomonoolefin, alkylstyrene, and optionally halogenated-para-alkylstyrene.

5. The composition of claim 1, wherein the grafted copolymer comprises a copolymer of isobutylene and para-methylstyrene, a halogenated copolymer of isobutylene and para-methylstyrene or mixtures thereof.

6. The composition of claim 5 wherein said grafted copolymer comprises from about 0.5 to about 20 mole % of para-methylstyrene.

7. The composition of claim 6 wherein said grafted copolymer is a brominated copolymer of isobutylene and para-methylstyrene.

8. The composition of claim 1, wherein the unsaturated organic compound is present in the grafted copolymer in an amount ranging from about 0.5 to 0.001 millimole per gram of the grafted polymer.

9. The composition of claim 1, wherein said unsaturated organic compound is a $C_3$ to $C_{12}$ monocarboxylic acid, a $C_3$ to $C_{12}$ polycarboxylic acid or a mixture thereof.

10. The composition of claim 1 wherein said unsaturated organic compound is selected from the group consisting of maleic acid, fumaric acid, citraconic acid, mesaconic acid, itaconic acid, himic acid, acetylenedicarboxylic acid and a mixture thereof.

11. The composition of claim 1 wherein said unsaturated organic compound is maleic anhydride.

12. The composition of claim 1 wherein the grafted copolymer is a copolymer of isobutylene and para-methylstyrene grafted with maleic anhydride.

13. The composition of claim 12 wherein said maleic anhydride is present in said grafted copolymer in an amount ranging from about 0.5 to 0.001 millimole per gram of said grafted copolymer.

14. The composition of claim 12 wherein said dissimilar elastomeric polymer is polychloroprene.

15. The composition of claim 12 wherein said dissimilar elastomeric polymer is polyisoprene.

16. A process for the production of an elastomeric compatibilized blend wherein the blend polymers consist essentially of a copolymer of a $C_4$ to $C_7$ isomonoolefin, para-alkylstyrene copolymer and a dissimilar elastomer selected from the group consisting of natural rubber, polyisoprene, polybutadiene, copolymers of butadiene with styrene, copolymers of butadiene with acrylonitrile, butyl rubber, polychloroprene, ethylene/propylene rubber and elastomeric copolymers of ethylene, propylene and a non-conjugated diene, said process comprising combining under blending conditions (a) the copolymer of a $C_4$ to $C_7$ isomonoolefin para-alkylstyrene copolymer, and optionally halogenated-containing para-alkylstyrene, free-radically grafted with an unsaturated carboxylic acid or a derivative thereof selected from the group consisting of unsaturated carboxylic acids, unsaturated carboxylic acid derivatives selected from esters, imides, amides, anhydrides and cyclic acid anhydrides or mixtures thereof; with (b) a dissimilar elastomer selected from the group consisting of natural rubber, polyisoprene, polybutadiene, copolymers of butadiene with styrene, copolymers of butadiene with acrylonitrile, butyl rubber, polychloroprene, ethylene/propylene rubber and elastomeric copolymers of ethylene, propylene and a non-conjugated diene.

17. The process of claim 16 wherein the copolymer (a) is grafted with maleic acid and the dissimilar elastomer is polychlorprene or polyisoprene.

18. The process of claim 17 wherein the maleic acid is present at about 0.5 to about 0.001 mmol/gram per gram of grafted copolymer, the grafted copolymer is present at 5 to 95 wt % and the dissimilar elastomer is present at 95 to 5 wt % based upon the blend weight.

19. An article comprising the composition of claim 1.

20. A belt, hose, film or molded article comprising the composition of claim 1.

21. The composition of claim 1 wherein the elastomeric copolymer further comprises halogenated-para-alkylstyrene.

* * * * *